(No Model.) 4 Sheets—Sheet 1.
O. M. MORSE.
SEPARATING MACHINE.
No. 441,372. Patented Nov. 25, 1890.
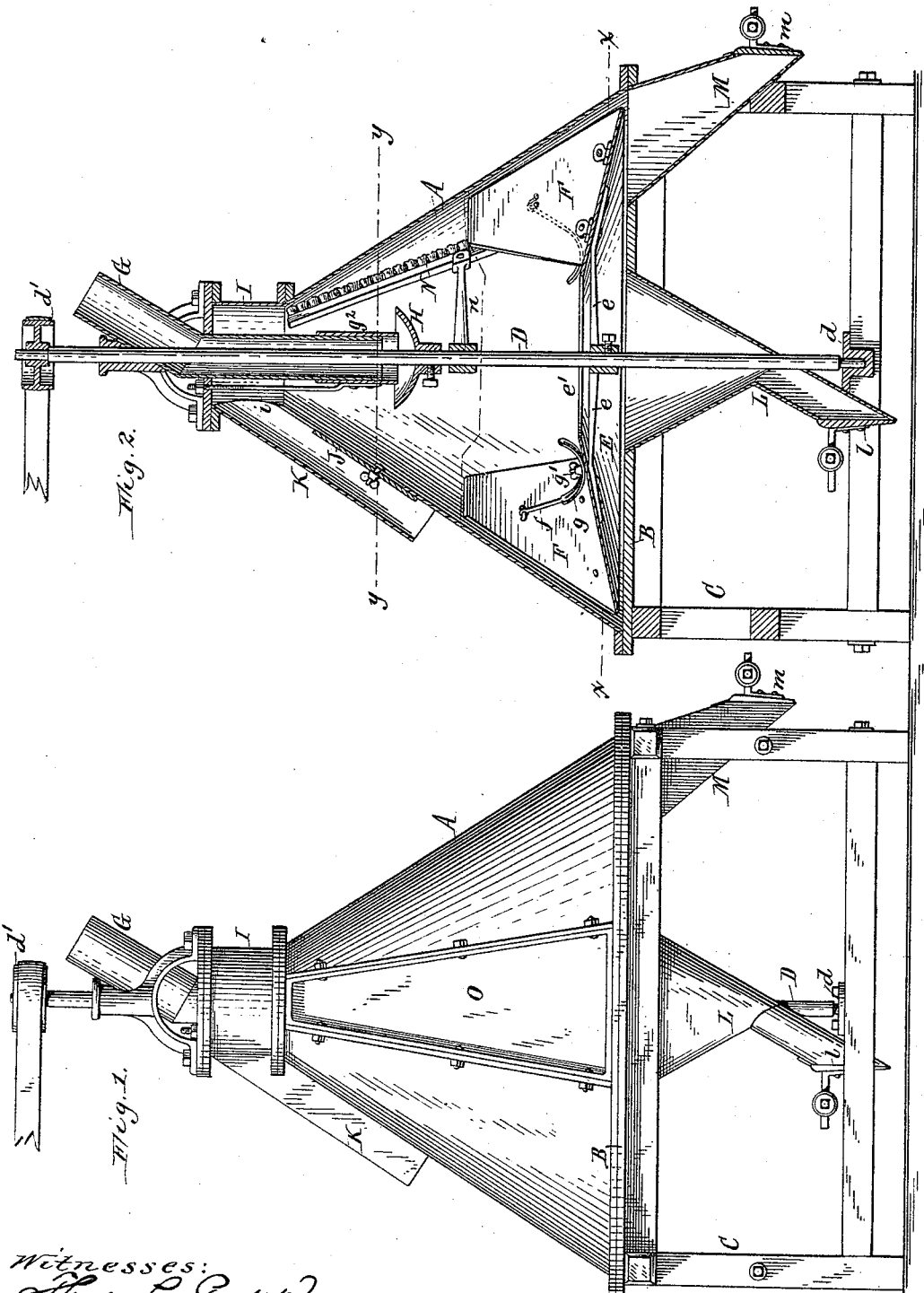
Witnesses:
Theo. L. Popp.
Chester D. Howe.
Orville M. Morse, Inventor.
By Wilhelm Bonner, Attorneys

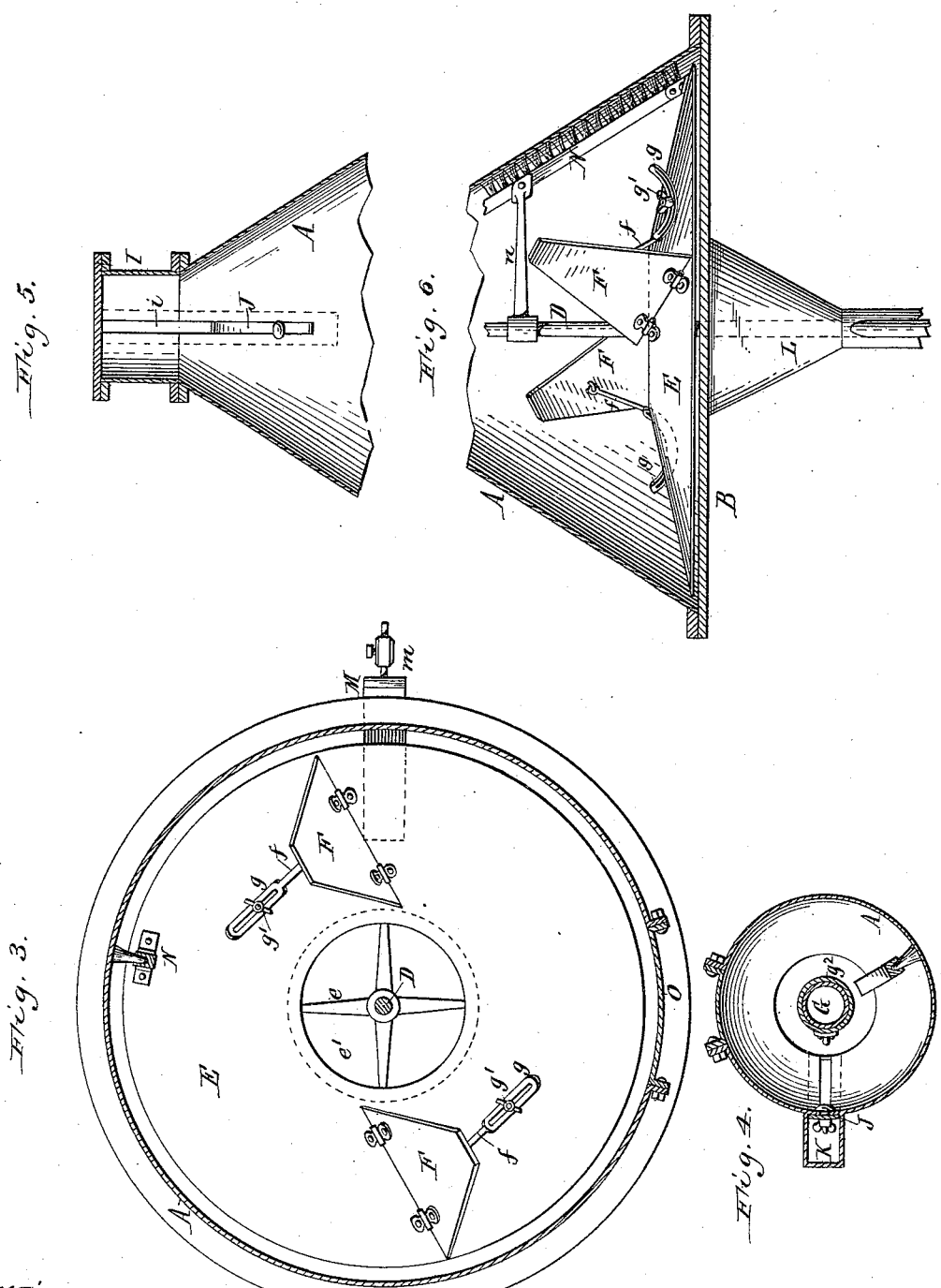

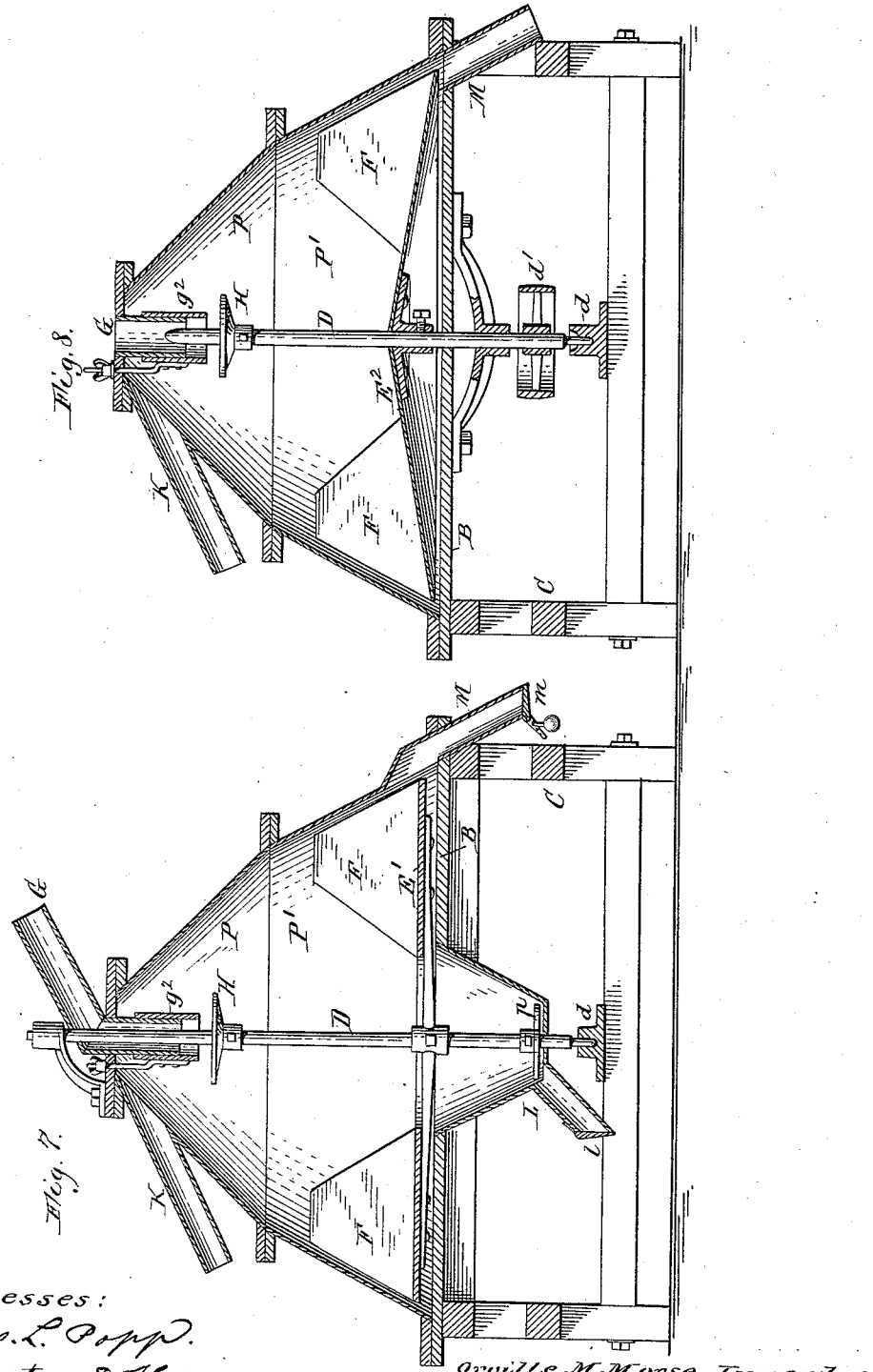

(No Model.) 4 Sheets—Sheet 4.
O. M. MORSE.
SEPARATING MACHINE.
No. 441,372. Patented Nov. 25, 1890.
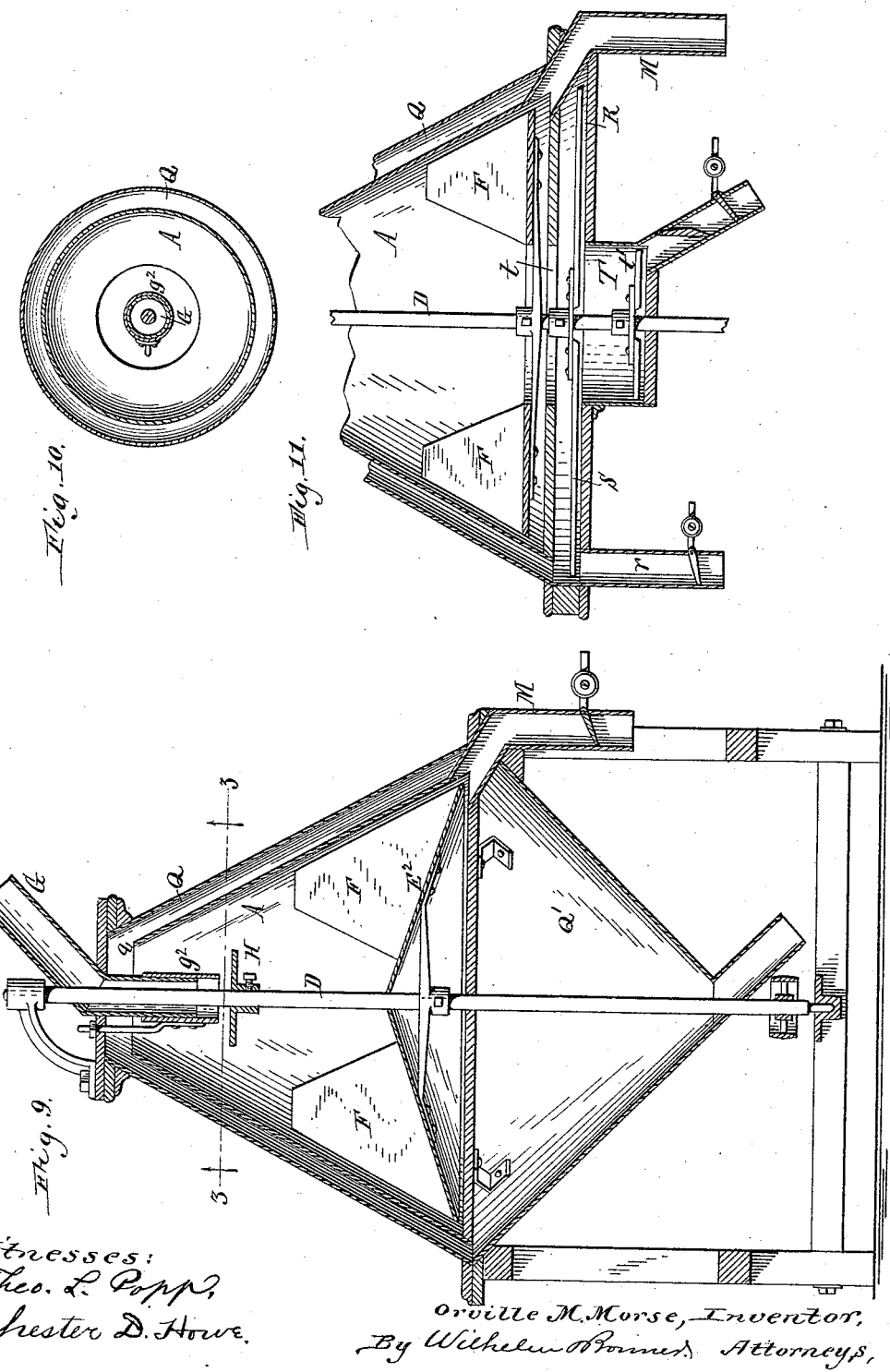
Witnesses:
Theo. L. Popp,
Chester D. Howe.
Orville M. Morse, Inventor,
By Wilhelm Bonner, Attorneys,

UNITED STATES PATENT OFFICE.

ORVILLE M. MORSE, OF JACKSON, MICHIGAN.

SEPARATING-MACHINE.

SPECIFICATION forming part of Letters Patent No. 441,372, dated November 25, 1890.

Application filed June 21, 1890. Serial No. 356,215. (No model.)

*To all whom it may concern:*

Be it known that I, ORVILLE M. MORSE, a citizen of the United States, residing at Jackson, in the county of Jackson and State of Michigan, have invented new and useful Improvements in Separating-Machines, of which the following is a specification.

This invention relates to a separating-machine for separating pulverulent, granular, and similar substances into different grades, according to fineness or weight, and in which such separation is effected by the rotative movement of a body of air in which the material to be separated is suspended. The machine is particularly useful for separating the light impurities from middlings and dust from grain, but may be used for a variety of other purposes.

The object of my invention is to produce a simple and effective machine which is practically inclosed, except where the products of the separation are discharged therefrom, and which does not blow dust, &c., out into the room or other inclosure in which it is located.

In the accompanying drawings, consisting of four sheets, Figure 1 is a side elevation of my improved separating-machine. Fig. 2 is a vertical section thereof. Figs. 3 and 4 are horizontal sections in lines $x$ $x$ and $y$ $y$, Fig. 2, respectively. Fig. 5 is a vertical section of the upper part of the casing at right angles to Fig. 2. Fig. 6 is a vertical section of the lower part of the machine, showing the revolving cone and its wings in elevation. Figs. 7, 8, and 9 are sectional elevations of modified constructions of my improved separating-machine. Fig. 10 is a horizontal section in line $z$ $z$, Fig. 9. Fig. 11 is a vertical section showing a modified construction of the lower part of the machine.

Like letters of reference refer to like parts in the several figures.

A represents the peripheral wall of an upwardly-tapering separating-chamber secured with its large lower end to a bottom plate B, which rests upon a frame-work C.

D is a vertical shaft arranged axially in the separating-chamber and supported with its lower end in a step-bearing $d$, while its upper end carries a driving-pulley $d'$, by which the shaft is rotated.

E is an annular p'ate, which is arranged above the bottom plate B and secured to the shaft D by arms $e$. This plate is slightly inclined from its central opening $e'$ to its periphery, and is provided on its upper side with one or more wings or blades F, which rotate in the chamber and impart a whirling motion to the air contained in the same. These blades are preferably hinged or pivoted to the annular supporting-plate E, so that they can be inclined to a greater or less angle, whereby the effect of the blades in throwing the solid matter and air upwardly in the chamber is regulated. The blades are supported in position by adjustable braces $f$, which are provided with curved and slotted lower ends through which pass thumb-screws $g'$, by which they are secured to the supporting-plate E.

G represents the feed-pipe, which enters the upper portion of the separating-chamber and is arranged with its lower portion axially in the same above a feed saucer or disk H, which latter is secured to the central shaft.

$g^2$ represents an adjustable sleeve on the feed-pipe by which the feed can be regulated.

The upper portion of the tapering case is closed by a cylindrical top I, which surrounds the feed-pipe and is provided on one side with a vertical opening $i$. The latter extends downwardly into the side of the tapering peripheral wall A, and its lower portion is provided with a slide J, attached to said wall, whereby the opening in the case can be opened or closed by moving the slide up or down.

K represents the spout, which covers the opening $i$ and conducts the material escaping therefrom to a suitable receptacle.

L is a discharge-spout secured to the bottom plate around the central shaft and provided with an automatic discharge-valve $l$.

M is a discharge-spout arranged in the bottom plate near the peripheral wall of the tapering case and provided with an automatic discharge-valve $m$.

When unpurified middlings are fed into the machine through the feed-pipe G, the middlings are scattered in the separating-chamber by the revolving saucer H, and in falling in the chamber they become suspended in the whirling body of air and rotate with the same. The heaviest particles of middlings are driven to the large end of the tapering chamber by centrifugal force and escape through the peripheral discharge-spout M. The lighter particles of middlings escape through the central discharge-spout L at the bottom of the chamber and the dust and fluff or light impurities rise in the case and escape through the opening *i* and spout K. The separation of the light dust from the heavier material is due in part to centrifugal force and in part to the circulation of air within the separating-chamber, in which the air moves outwardly over the revolving annular plate to the large end of the tapering chamber, thence upwardly toward the small end thereof along the peripheral wall of the chamber, and thence downwardly in the axial portion of the chamber toward the bottom. The upward movement of the air along the inner surface of the tapering wall is strong enough to carry the dust and other light impurities to the discharge-opening *i*, which lies near the axis of rotation, but is incapable of moving the heavier particles of middlings, which possess greater ponderosity and are therefore more influenced by centrifugal force. By raising or lowering the gate or slide J in the dust-outlet *i* the point of overflow of the dust can be placed higher or lower and nearer to the axis of rotation or farther therefrom, whereby the quality of material which escapes from the dust-outlet can be regulated. When the blades are inclined in the direction in which they rotate, they deflect the air and the solid particles contained therein outwardly and upwardly. By changing the angle of the blades the height to which the heavier particles are caused to rise in the separating-chamber may be increased or reduced and the separation be accordingly regulated. It is desirable that the outlets for the heavy matter should be provided with traps or valves to prevent as much as possible the escape of air with the material; but when these outlets are comparatively small they may be left unprotected. A rotating brush N may be arranged to sweep the inner side of the separating-chamber and keep the same free from deposits of fine adhesive dust. This brush may be connected with the shaft by an arm *n*, or it may be caused to rotate by any other suitable means. The side of the separating-case is preferably provided with a removable section or panel O, or with a door by which access can be had to the interior.

In the modified construction represented in Fig. 7, the separating-chamber is composed of an upper section P and a lower section P', having different bevels. The annular plate E' is made flat or plane instead of raised in the center, and the shaft is provided with a stirrer *p* over the bottom of the central discharge-spout.

In the modified construction represented in Fig. 8, the annular plate E² has no opening around the shaft and the central discharge-spout is omitted, so that the machine makes but two separations—the heavy material which escapes through the peripheral discharge-spout and the light material which escapes through the spout near the apex.

In the modified construction represented in Figs. 9 and 10, the discharge of the light material takes place by overflowing over the edge of a circular opening *q* at the small end of the separating-chamber into a conical casing Q, which surrounds the separating-chamber and delivers the dust to the hopper Q' below the separating-chamber.

In the modified construction represented in Fig. 11, the dust-casing Q connects at its bottom with a flat-bottomed receptacle R, which is provided at its periphery with a spout *r*, to which the dust is moved by a sweep S attached to the shaft.

The bottom of the separating-chamber is provided with a central opening *t*, through which the material of medium gravity drops into a receptacle T, from which it is removed by a sweep *t'* attached to the shaft.

My improved separating-machine is very simple and compact in construction, takes up little room and requires little power for its operation, has a steady rotative motion which does away with the jarring caused by machines having reciprocating parts, and discharges practically no air, so that no dust is blown out into the mill. The bottom plate rotating with the shaft will cause a rotative movement of the body of air in the separating-chamber in the absence of any wings or plates; but I prefer to employ the latter, because they are more reliable and when adjustable permit a better regulation of the separation.

I claim as my invention—

1. The combination, with a closed tapering separating-chamber provided at its large end with an outlet for the heavy material and at its small end with an outlet for the light material, of a feeder which delivers the material to be separated into the chamber, and a rotating air-propelling device arranged within the chamber, whereby the air contained in the chamber is caused to circulate from the axial portion of the chamber to the peripheral wall at the large end, thence along the peripheral wall to the small end, and thence back to the large end through the axial portion of the chamber, thereby separating the heavy from the light material and discharging the products of the separation, respectively, from the large and small ends of the separating-chamber, substantially as set forth.

2. The combination, with a closed chamber tapering upwardly and provided with an outlet for the light material at its upper end and an outlet for the heavy material at its lower end, of a feeder delivering the material to be separated into the upper portion of the separating-chamber, and a rotating air-propelling device arranged within the separating-chamber, whereby the air contained therein is caused to circulate in the same along the peripheral wall to the upper end and through the axial portion back to the lower end, substantially as set forth.

3. The combination, with a closed tapering separating-chamber provided with an outlet for the light material at its small end and an outlet for the heavy material at its large end, of a feeder whereby the material to be separated is delivered into the separating-chamber, a rotating shaft arranged axially in the separating-chamber, and an air-propelling device mounted on said shaft in the large portion of the separating-chamber, whereby the air is caused to circulate within the chamber along the peripheral wall to the small end and through the axial portion back to the large end, substantially as set forth.

4. The combination, with a tapering separating-chamber provided with means whereby the body of air in the chamber is caused to rotate therein, of a feeder whereby the material to be separated is delivered into the chamber, and outlets for the heavy and light material arranged at different distances from the axis of rotation, substantially as set forth.

5. The combination, with an upwardly-tapering separating-chamber provided with means whereby the body of air in the chamber is caused to rotate therein, of a feeder whereby the material to be separated is delivered into the chamber, an outlet for the heaviest material arranged at the bottom of the chamber near its periphery, and an outlet for lighter material arranged in the bottom of the chamber near its center, substantially as set forth.

6. The combination, with an upwardly-tapering separating-chamber provided with means whereby the body of air in the chamber is caused to rotate therein, of a feeder whereby the material to be separated is delivered into the chamber, an outlet for the heaviest material arranged at the bottom of the chamber near its periphery, an outlet for lighter material arranged in the bottom of the chamber near its center, and an outlet for the lightest material at the top of the chamber, substantially as set forth.

7. The combination, with a circular separating-chamber provided with a feeder whereby the material to be separated is delivered into the chamber and with an outlet for the heavy material at its bottom and an outlet for the light material at its top, of rotating blades arranged obliquely in the separating-chamber whereby the material is deflected upwardly, substantially as set forth.

8. The combination, with a tapering separating-chamber provided with a feeder whereby the material to be separated is delivered into the chamber and with an outlet for light material near its small end and an outlet for heavy material near its large end, of a rotating shaft arranged axially in the chamber, and oblique blades connected with said shaft whereby the material is deflected toward the small end of the chamber, substantially as set forth.

9. The combination, with an upwardly-tapering separating-chamber provided with a feeder whereby the material to be separated is delivered into the chamber and with outlets for the heavy and light material at different distances from the axis of the chamber, of a rotating shaft arranged centrally in the chamber, a circular plate secured to said shaft, and wings or blades secured to said plate, substantially as set forth.

10. The combination, with a tapering separating-chamber, of a feeder whereby the material to be separated is delivered into the chamber, means whereby the body of air in the chamber is caused to rotate therein, an outlet for solid matter, and an adjustable gate applied to said outlet, substantially as set forth.

11. The combination, with a closed tapering separating-chamber provided with outlets for the heavy and light material, located, respectively, at its large and small ends, of a feeder whereby the material to be separated is delivered into the chamber, a rotating air-propelling device arranged within the chamber and causing the air contained therein to circulate along the peripheral wall to the small end of the chamber and through the axial portion back to the large end, and a rotating cleaner sweeping the inner surface of the separating-chamber, substantially as set forth.

Witness my hand this 14th day of June, 1890.

ORVILLE M. MORSE.

Witnesses:
JNO. G. MUNDY,
C. H. HIGDON.